US006473679B1

(12) United States Patent
Tady et al.

(10) Patent No.: US 6,473,679 B1
(45) Date of Patent: Oct. 29, 2002

(54) ANGULAR VELOCITY CONTROL AND ASSOCIATED METHOD FOR A BOOM OF A MACHINE

(75) Inventors: Stephen T. Tady, Dekalb; Brian D. Rockwood, Washington; Everett G. Brandt, Brimfield, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/459,160

(22) Filed: Dec. 10, 1999

(51) Int. Cl.$^{7}$ .................................................. G06F 7/00
(52) U.S. Cl. .............................................. 701/50; 172/2
(58) Field of Search ................................ 701/50; 172/2

(56) References Cited

U.S. PATENT DOCUMENTS

| | | | | |
|---|---|---|---|---|
| 4,712,376 | A | | 12/1987 | Hadank et al. |
| 4,722,044 | A | | 1/1988 | Heiser et al. |
| 4,760,513 | A | | 7/1988 | Edwards |
| 4,910,662 | A | | 3/1990 | Heiser et al. |
| 5,160,239 | A | | 11/1992 | Allen et al. |
| 5,257,177 | A | | 10/1993 | Bach et al. |
| 5,424,623 | A | | 6/1995 | Allen et al. |
| 5,461,803 | A | * | 10/1995 | Rocke ......................... 37/443 |
| 5,467,829 | A | | 11/1995 | Barton et al. |

FOREIGN PATENT DOCUMENTS

| | | |
|---|---|---|
| GB | 2 261 962 | 6/1993 |
| GB | 2 314 551 | 1/1998 |
| JP | 11222395 | 8/1999 |

* cited by examiner

*Primary Examiner*—Yonel Beaulieu
(74) *Attorney, Agent, or Firm*—Howard & Howard

(57) ABSTRACT

An angular velocity control for a boom of a machine is disclosed and a method for controlling the angular velocity of a boom of a machine. The angular velocity control includes a calculator that detects input signals from an operator control lever, a boom angle sensor, a cylinder length sensor, a chassis cant sensor, and a chassis tilt sensor. Movement of the operator control lever allows an operator to pre-select a desired angular velocity. Based on the geometry of the boom to the machine the calculator calculates a boom gain associated with the current boom angle. The calculator then calculates a necessary cylinder velocity to achieve the desired angular velocity. The calculator sends a control signal to an electrohydraulic control module which in turn sends a signal to an electrohydraulic valve associated with a boom lift cylinder. The electrohydraulic valve alters the flow rate of hydraulic fluid into or out of the boom lift cylinder to produce a cylinder velocity that in turn produces the desired angular velocity of the boom.

19 Claims, 2 Drawing Sheets

ANGULAR VELOCITY CONTROL AND ASSOCIATED METHOD FOR A BOOM OF A MACHINE

TECHNICAL FIELD

This invention relates generally to a boom on a machine, and more particularly to a method and an apparatus for controlling the angular velocity of the boom on the machine.

BACKGROUND ART

Many machines, including, for example telehandlers, include booms. Generally an implement such as, for example, a bucket, fork tines or basket, is located at the end of the boom for manipulation by the operator. A typical boom can be extended over twenty feet (6.1 meters) and can be elevated to an angle of about eighty degrees with respect to the machine.

In a typical machine the elevation and lowering of the boom is accomplished by a hydraulic boom lift cylinder. A control lever is moved by the operator to effect a lowering or raising of the boom. In a typical machine the boom elevation control circuit is a closed centered, load sensing, pressure compensated circuit, therefore the boom lift cylinder velocity remains constant at all lever positions for a given engine speed. In such a system, however, the geometry of the boom to the chassis of the machine and the boom lift cylinder causes the angular velocity of the boom to vary widely depending on the angle of the boom to the chassis. The relationship causes the angular velocity to increase as the angle of the boom to the chassis increases. The change in angular velocity with boom angle makes it very difficult for the operator to precisely control the distant end of the boom as the boom angle increases. This becomes especially difficult as the boom is also extended.

Thus, it would be desirable to provide a control wherein the angular velocity of the boom is constant, for a given lever position and engine speed, over a range of boom angles.

The present invention is directed to overcome one or more of the problems as set forth above.

DISCLOSURE OF THE INVENTION

In one aspect of this invention, a method for maintaining a constant angular velocity for a boom of a machine is disclosed. This method includes the steps of pre-selecting a desired angular velocity for a boom of a machine, forming a triangle, the first leg comprising a fixed distance A between a pivot point of the boom to the machine and an attachment point of a boom lift cylinder to the boom, the second leg comprising a fixed distance B between the pivot point of the boom to the machine and an attachment point of the boom lift cylinder to the machine, and the third leg comprising a variable distance C between the attachment point of the boom lift cylinder to the boom and the attachment point of the boom lift cylinder to the machine, distance C varying as the boom lift cylinder extends and retracts to lift and lower the boom, determining the length of distances A, B and C at a first point in time, determining at the first point in time the value of the sine of an angle θ formed by the intersection of the first leg and the second leg, calculating at the first point in time a boom gain value by dividing the product of A, B, and the sine of θ by C, calculating a desired boom lift cylinder velocity at the first point in time by taking the product of the boom gain at the first point in time and the pre-selected desired angular velocity, adjusting an actual boom lift cylinder velocity to equal the desired boom lift cylinder velocity, thereby producing an actual angular velocity of the boom that equals the pre-selected desired angular velocity, and repeating the step of determining the length of distances A, B and C at a first point in time through the step of adjusting an actual boom lift cylinder velocity to equal the desired boom lift cylinder velocity, thereby producing an actual angular velocity of the boom that equals the pre-selected desired angular velocity at a second point in time wherein the length of C and therefore the value of the sine of angle θ are different at the second point in time from the first point in time.

In another aspect of the invention an angular velocity control for a boom of a machine is disclosed. This control includes a boom pivotally attached to a pivot point on a machine, an operator control lever, movement of the control lever from a reference position to a first position different from the reference position generating a first angular velocity signal, the first angular velocity signal associated with a desired angular velocity of the boom, a hydraulic boom lift cylinder having a first end attached to the boom at a cylinder attachment point spaced a distance A from the pivot point, a second end attached to the machine at a point spaced a distance B from the pivot point, and a distance C between the first and the second ends, extension and retraction of the cylinder pivoting the boom about the pivot point, a triangle having as apexes the pivot point, the first end and the second end, and an angle θ within the triangle having the pivot point as an apex, a sensor, the sensor detecting one of the distance C or the angle θ, a calculator, the calculator calculating the other of the distance C or the angle θ based on the distance A, the distance B and the sensed one of the distance C or the angle θ, the calculator calculating a boom gain by dividing the product of the distance A, the distance B and a sine of the angle θ by the distance C, the calculator detecting the first angular velocity signal and calculating a desired cylinder velocity equal to the product of the desired angular velocity and the boom gain, and the calculator generating a control signal associated with the desired cylinder velocity, and an electrohydraulic control module, the control module detecting the control signal and actuating an electrohydraulic valve associated with the cylinder, actuation of the valve flowing a hydraulic fluid into or out of the cylinder at a flow rate based on the control signal, the flow rate producing an actual cylinder velocity of the cylinder equal to the desired cylinder velocity.

BEST MODE CARRYING OUT THE INVENTION

Figure 1:
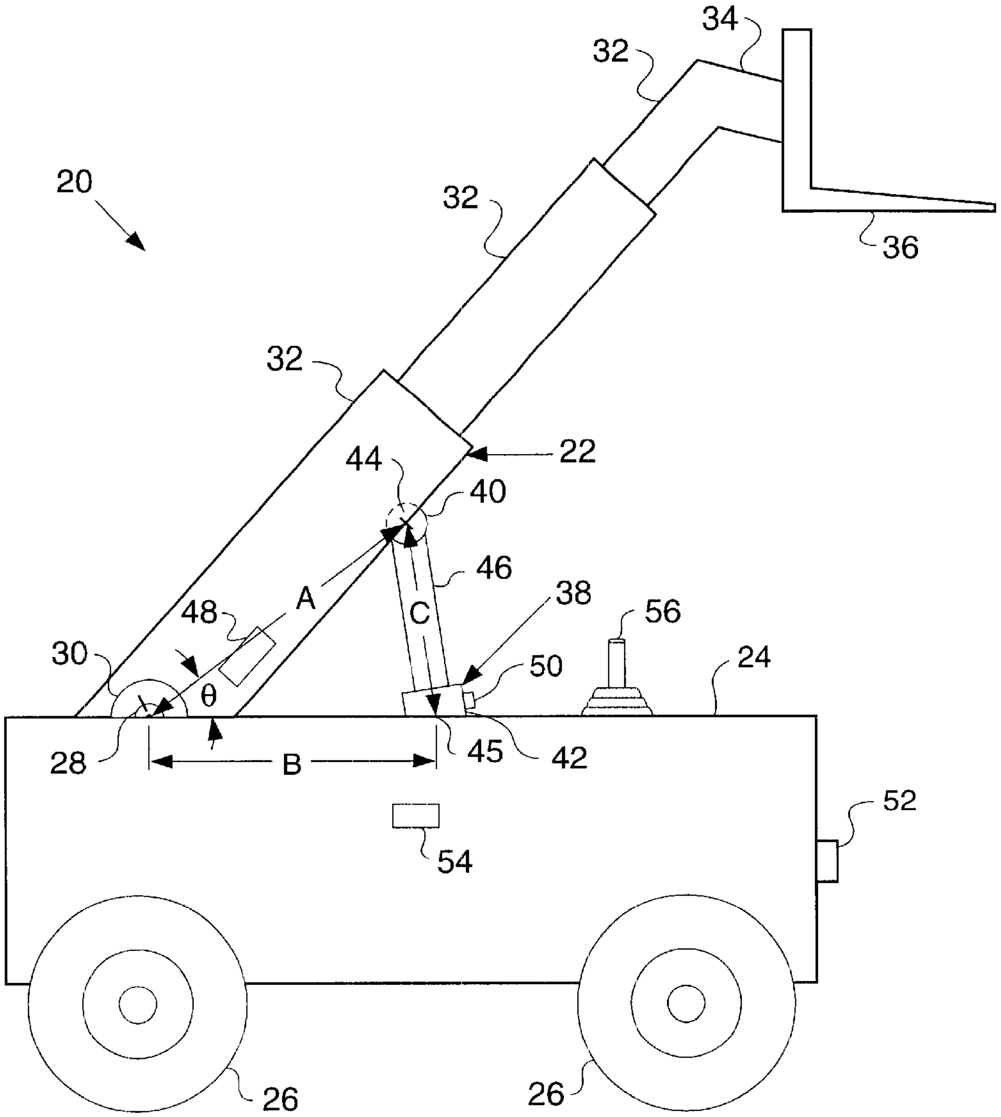
FIG. 1 is a side elevation of a machine having a boom and incorporating an angular velocity control designed according to the present invention.

In FIG. 1, a machine is shown generally at 20. Machine 20 includes a boom 22 and is shown as a telehandler, but as would be understood by one of ordinary skill in the art, machine 20 could be any machine with a boom 22. Machine 20 includes a frame 24 supported on a plurality of ground wheels 26. Boom 22 is pivotally attached to a pivot point 28 on machine 20 by a bracket 30 as is known in the art. Boom 22 is extendable and is shown extended with a plurality of boom extensions 32 as is known in the art. Boom 22 includes a distal end 34 to which an implement can be mounted. Distal end 34 is shown with a pair of fork tines 36 attached to it. As is known in the art, boom 22 can accommodate other implements such as, for example, a scoop or a cherry picker type bucket.

A hydraulic boom lift cylinder 38 includes a first end 40 opposite a second end 42. The first end 40 attaches to the boom 22 at a cylinder attachment point 44. The second end 42 attaches to the machine 20 at an attachment point 45. A triangle is formed having as apexes pivot point 28, the first end 40 and the second end 42 where it attaches to point 45. A distance A is between pivot point 28 and first end 40, a distance B is between pivot point 28 and second end 42, and a distance C is between first end 40 and second end 42. The triangle includes an angle θ having as its apex pivot point 28. Distances A and B are fixed, while distance C and the value of angle θ are variable. Angle θ is the boom angle. Cylinder 38 is of a typical design and includes a piston 46 that is movable into and out of the cylinder 38. Extension of the piston 46 of cylinder 38 raises boom 22 thereby increasing the angle θ, retraction of the piston 46 lowers the boom 22 and decreases the angle θ. Cylinder 38 is at an angle of approximately 80 degrees with respect to frame 24.

Machine 20 further includes a boom angle sensor 48 mounted on boom 22. Boom angle sensor 48 detects the boom angle θ. A cylinder length sensor 50 mounted to cylinder 38 detects the length of distance C. Machine 20 further includes a chassis tilt sensor 52 which detects the sideways tilt of machine 20 relative to a horizontal plane, in other words the tilt along one of the axles of the ground wheels 26. A chassis cant sensor 54 detects the forward to rearward cant of the machine 20 relative to a horizontal plane. In other words, the amount that the front ground wheels 26 are above or below the rear ground wheels 26.

Machine 20 further includes an operator control lever 56. Movement of the operator control lever 56 from a reference position signals a desired angular velocity for the boom 22. In addition, the direction of movement of the operator control lever 56 determines whether the cylinder 38 lifts or lowers the boom 22. The maximal angular velocity of the boom 22 of the present invention is determined by the engine speed of machine 20.

Figure 2:
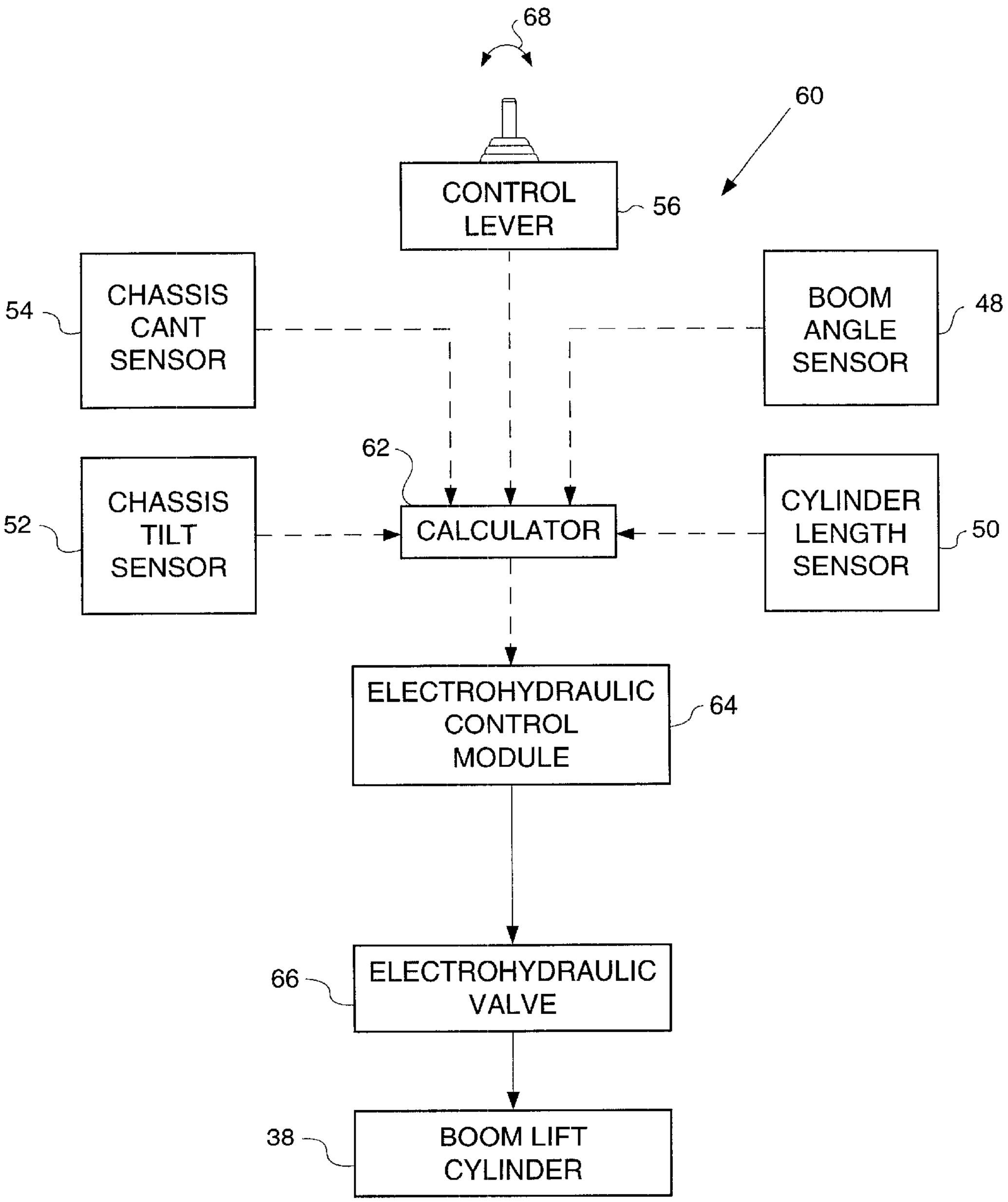
FIG. 2 is a schematic diagram of the angular velocity control of the present invention.

A schematic diagram of an angular velocity control designed according to the present invention is shown at 60 in FIG. 2. Angular velocity control 60 includes a calculator 62, an electrohydraulic control module 64 and an electrohydraulic valve 66.

Calculator 62 receives input from a variety of sources including control lever 56, boom angle sensor 48, cylinder length sensor 50, chassis tilt sensor 52, and chassis cant sensor 54. Movement of control lever 56 from the reference position, as shown, to one of a plurality of positions designated by axis arrow 68, allows an operator to select a desired angular velocity. Movement of control lever 56 from the reference position sends an angular velocity signal to calculator 62. Calculator 62 includes the known values of distances A and B. Because control lever 56 is moveable between a plurality of positions relative to the reference position, control lever 56 is capable of sending a plurality of desired angular velocity signals to calculator 62. Each of the desired velocity signals is associated with a desired angular velocity. Calculator 62 further receives input from the boom angle sensor 48 regarding the boom angle of boom 22, angle θ. Calculator 62 further receives input from the cylinder length sensor 50. Because calculator 62 includes information on distances A, B and one of boom angle θ or distance C, it can therefor calculate the other of boom angle θ or distance C. Calculator 62 further receives input from chassis cant sensor 54 and chassis tilt sensor 52. After calculator 62 calculates the unknown of either angle θ or distance C, it then calculates boom gain value using the following equation:

$$\frac{(A)*(B)*(\sin e\theta)}{C} = Boom\ Gain\ (BG)$$

The boom gain is related to the desired angular velocity and the cylinder velocity by the following equation:

$$AV = \frac{(CV)}{(BG)}$$

Where an angular velocity (AV) equals cylinder velocity (Cv) times boom gain (BG). Therefore, after calculating boom gain calculator 62 uses the angular velocity associated with the detected angular velocity signal and the calculated boom gain to calculate the necessary cylinder velocity. After calculating the necessary actual cylinder velocity, calculator 62 sends a control signal to the electrohydraulic control module 64. The electrohydraulic control module 64 subsequently sends a signal to the electrohydraulic valve 66 associated with boom lift cylinder 38. The control signal from the electrohydraulic control module 64 causes electrohydraulic valve 66 to alter the flow rate of a hydraulic fluid either into or out of boom lift cylinder 38 at a rate which produces the cylinder velocity calculated by calculator 62. The direction of movement of control lever 56 along axis arrow 68 determines whether boom lift cylinder 38 is actuated to extend to retract thereby raising or lowering boom 22.

Calculator 62 furthermore receives inputs from chassis cant sensor 54 and chassis tilt sensor 52. These sensors detect when the machine 20 is either canted to one side or tilted to the front or rear. When machine 20 is either tilted or canted relative to a horizontal plane, it is desirable to further slow the angular velocity of boom 22 to maintain the stability within a predetermined operating range of the machine 20. Therefore, when calculator 62 receives input either from chassis cant sensor 54 or chassis tilt sensor 52 the amount of tilt or cant relative to the horizontal plane is associated with either a tilt or cant signal. Each tilt or cant signal is associated with a specific value which is combined with a previously determined boom gain. As a result, when machine 20 is either tilted or canted relative to the horizontal plane, the cylinder velocity is additionally slowed for a given pre-selected angular velocity.

The signals that are sent by the control lever 56, boom angle sensor 48, cylinder length sensor 50, chassis cant sensor 54, or chassis tilt sensor 52 can be any one of a variety of signals, including, radio signals, microwave signals or electrical signals.

The desired angular velocity is variable between 0.1 and 8 degrees per second. The value of angle θ is variable between −4.5 and approximately 80 degrees relative to the horizontal plane. The actual cylinder velocity is variable between approximately 0.01 and 7.5 inches (0.00025 and 0.19 meters) per second. The boom lift cylinder 38 generally has a maximal stroke length of 58 inches (1.47 meters).

Of course, various modifications of this invention would come within the scope of the invention.

INDUSTRIAL APPLICABILITY

The present invention discloses an angular velocity control 60 for a boom 22 of a machine 20. Angular velocity control 60 permits an operator to pre-select a desired angular velocity for a boom 22 of the machine 20. The pre-selected angular velocity is achieved by altering the rate of the cylinder velocity of the boom lift cylinder 38. The angular velocity control 60 includes an operator control lever 56 that is manipulatable by an operator. Movement of control lever 56 from a reference position by the operator pre-selects a desired angular velocity which is communicated to a calculator 62. Based on the geometry associated with a triangle having as apexes a pivot point 28, a first end 40, an a second end 42 of boom lift cylinder 38, the calculator 62 calculates what cylinder velocity will produce the desired angular velocity of the boom 22. The calculator 62 then sends a control signal to an electrohydraulic control module 64 which in turn sends a signal to an electrohydraulic valve 66 associated with boom lift cylinder 38. Based on the signal from the electrohydraulic control module 64 the electrohydraulic valve 66 alters the rate of hydraulic fluid flow into or out of boom lift cylinder 38 in order to achieve the desired directionality and cylinder velocity which will produce the pre-selected angular velocity for boom 22.

Other aspects, objects and advantages of this invention can be obtained from a study of the drawings, the disclosure and the appended claims.

What is claimed is:

1. A method for maintaining a constant angular velocity for a boom of a machine comprising the steps of:

pre-selecting a desired angular velocity for a boom of a machine;

forming a triangle, the first leg comprising a fixed distance A between a pivot point of the boom to the machine and an attachment point of a boom lift cylinder to the boom, the second leg comprising a fixed distance B between the pivot point of the boom to the machine and an attachment point of the boom lift cylinder to the machine, and the third leg comprising a variable distance C between the attachment point of the boom lift cylinder to the boom and the attachment point of the boom lift cylinder to the machine, distance C varying as the boom lift cylinder extends and retracts to lift and lower the boom;

determining the length of distances A, B and C at a first point in time;

determining at the first point in time the value of the sine of an angle θ formed by the intersection of the first leg and the second leg;

calculating at the first point in time a boom gain value by dividing the product of A, B, and the sine of θ by C;

calculating a desired boom lift cylinder velocity at the first point in time by taking the product of the boom gain at the first point in time and the pre-selected desired angular velocity;

adjusting an actual boom lift cylinder velocity to equal the desired boom lift cylinder velocity, thereby producing an actual angular velocity of the boom that equals the pre-selected desired angular velocity; and repeating the step of determining the length of distances A, B and C at a first point in time through the step of adjusting an actual boom lift cylinder velocity to equal the desired boom lift cylinder velocity, thereby producing an actual angular velocity of the boom that equals the pre-selected desired angular velocity at a second point in time wherein the length of C and therefore the value of the sine of angle θ are different at the second point in time from the first point in time.

2. A method as recited in claim 1, wherein the step of determining the length of distances A, B and C at a first point in time and the step of determining at the first point in time the value of the sine of an angle θ formed by the intersection of the first leg and the second leg includes the further steps of:

pre-determining the values of distances A and B each at constant values;

determining the value of angle θ at the first point in time; and calculating the value of distance C based on the values of A, B, and angle θ.

3. A method as recited in claim 1, wherein the step of determining the length of distances A, B and C at a first point in time and the step of determining at the first point in time the value of the sine of an angle θ formed by the intersection of the first leg and the second leg includes the further steps of:

pre-determining the values of distances A and B each at constant values;

determining the value of distance C at the first point in time; and calculating the value of angle θ based on the values of A, B, and C.

4. A method as recited in claim 1, wherein the pre-selected desired angular velocity is variable and the step of pre-selecting a desired angular velocity for a boom of a machine further includes the steps of detecting a control signal and pre-selecting the desired angular velocity based on a value associated with the detected control signal.

5. A method as recited in claim 4, includes the further steps of moving an operator control lever to a first position relative to a reference position of the operator control lever and generating the control signal based on the movement of the control lever to the first position.

6. A method as recited in claim 5, includes the further steps of moving the operator control lever to a second position relative to the reference position of the operator control lever, the second position being different from the first position, and generating the control signal based on the movement of the control lever to the second position, the pre-selected desired angular velocity being different when the operator control lever is at the second position relative to when the operator control lever is at the first position.

7. A method as recited in claim 5, includes the further steps of moving the operator control lever in a first direction to increase the values of C and θ and moving the operator control lever in a second direction different from the first direction to decrease the values of C and θ.

8. A method as recited in claim 1, wherein the boom lift cylinder comprises a hydraulic cylinder and the step of adjusting an actual boom lift cylinder velocity to equal the desired boom lift cylinder velocity, thereby producing an actual angular velocity of the boom that equals the pre-selected desired angular velocity includes altering a flow rate of a hydraulic fluid into or out of the hydraulic cylinder to adjust the actual boom lift cylinder velocity to equal the desired boom lift cylinder velocity.

9. An angular velocity control for a boom of a machine comprising:

a boom pivotally attached to a pivot point on a machine;

an operator control lever, movement of the control lever from a reference position to a first position different from the reference position generating a first angular velocity signal, the first angular velocity signal associated with a desired angular velocity of the boom;

a hydraulic boom lift cylinder having a first end attached to the boom at a cylinder attachment point spaced a distance A from the pivot point, a second end attached to the machine at a point spaced a distance B from the pivot point, and a distance C between the first and the second ends, with extension and retraction of the cylinder pivoting the boom about the pivot point;

a triangle having as apexes the pivot point, the first end and the second end, and an angle θ within the triangle having the pivot point as an apex;

a sensor, the sensor detecting one of the distance C or the angle θ;

a calculator, the calculator calculating the other of the distance C or the angle θ based on the distance A, the distance B and the sensed one of the distance C or the angle θ, the calculator calculating a boom gain by dividing the product of the distance A, the distance B and a sine of the angle θ by the distance C, the calculator detecting the first angular velocity signal and calculating a desired cylinder velocity equal to the product of the desired angular velocity and the boom gain, and the calculator generating a control signal associated with the desired cylinder velocity; and an electrohydraulic control module, the control module detecting the control signal and actuating an electrohydraulic valve associated with the cylinder, actuation of the valve flowing a hydraulic fluid into or out of the cylinder at a flow rate based on the control signal, the flow rate producing an actual cylinder velocity of the cylinder equal to the desired cylinder velocity.

10. An angular velocity control as recited in claim 9, wherein the sensor detects the distance C.

11. An angular velocity control as recited in claim 9, wherein the sensor detects the angle θ.

12. An angular velocity control as recited in claim 9, wherein the angle θ is variable between 1 degree and about 85 degrees.

13. An angular velocity control as recited in claim 9, wherein the control lever is movable between a plurality of positions, each of the plurality of positions different from each other and different from the reference position, movement between each of the plurality of positions generating an angular velocity signal and each of the angular velocity signals associated with a different desired angular velocity of the boom.

14. An angular velocity control as recited in claim 9, wherein movement of the control lever in a first direction retracts the cylinder thereby lowering the boom and movement of the control lever in a second direction opposite the first direction extends the cylinder thereby raising the boom.

15. An angular velocity control as recited in claim 9, wherein the desired angular velocity of the boom is variable between 0.1 and 8 degrees per second.

16. An angular velocity control as recited in claim 9, wherein the actual cylinder velocity is variable between about 0.01 and 7.5 inches (0.00025 and 0.19 meters) per second.

17. An angular velocity control as recited in claim 9, wherein the boom lift cylinder has a maximal stroke length of 58 inches (1.47 meters).

18. An angular velocity control as recited in claim 9, further including a chassis cant sensor, the chassis cant sensor detecting a cant of the machine relative to a horizontal plane and sending a cant signal to the calculator; the calculator detecting the cant signal and summing the cant signal with the calculated boom gain.

19. An angular velocity control as recited in claim 9, further including a chassis tilt sensor, the chassis tilt sensor detecting a tilt of the machine relative to a horizontal plane and sending a tilt signal to the calculator, the calculator detecting the tilt signal and summing the tilt signal with the boom gain.

* * * * *